(12) United States Patent
Ptak

(10) Patent No.: US 7,566,048 B1
(45) Date of Patent: Jul. 28, 2009

(54) FAN SPRAY DEVICE

(75) Inventor: Victor Ptak, Plymouth, MI (US)

(73) Assignee: Stylus, Inc., Southfield, MI (US)

( * ) Notice: Subject to any disclaimer, the term of this patent is extended or adjusted under 35 U.S.C. 154(b) by 0 days.

(21) Appl. No.: 12/233,081

(22) Filed: Sep. 18, 2008

(51) Int. Cl.
*B01F 3/04* (2006.01)

(52) U.S. Cl. .............................. 261/28; 261/89; 261/90; 261/DIG. 43; 239/289; 222/383.1

(58) Field of Classification Search .................... 261/28, 261/72.1, 84, 89, 90, 116, DIG. 3, DIG. 43; 239/152, 289, 333; 222/383.1
See application file for complete search history.

(56) References Cited

U.S. PATENT DOCUMENTS

| 3,997,115 | A |   | 12/1976 | Licudine |
|---|---|---|---|---|
| 4,198,557 | A | * | 4/1980 | Crowley ..................... 392/384 |
| 4,839,106 | A |   | 6/1989 | Steiner |
| D349,954 | S |   | 8/1994 | Steiner et al. |
| 5,338,495 | A |   | 8/1994 | Steiner et al. |
| 5,395,046 | A | * | 3/1995 | Knobbe et al. ................. 239/3 |
| 5,620,633 | A |   | 4/1997 | Junkel et al. |
| 5,667,731 | A |   | 9/1997 | Junkel et al. |
| D386,572 | S |   | 11/1997 | Radtke et al. |
| D387,422 | S |   | 12/1997 | Radtke et al. |
| D387,852 | S |   | 12/1997 | Radtke et al. |
| 5,715,999 | A |   | 2/1998 | Hsu |
| 5,752,662 | A |   | 5/1998 | Hsu |
| D395,701 | S |   | 6/1998 | Radtke et al. |
| D396,104 | S |   | 7/1998 | Radtke |
| D397,427 | S |   | 8/1998 | Junkel et al. |
| D397,774 | S |   | 9/1998 | Junkel et al. |
| 5,843,344 | A |   | 12/1998 | Junkel et al. |
| 5,851,106 | A |   | 12/1998 | Steiner et al. |
| 5,897,027 | A |   | 4/1999 | Steiner et al. |
| 5,965,067 | A |   | 10/1999 | Junkel et al. |
| 6,109,874 | A |   | 8/2000 | Steiner et al. |
| D439,966 | S |   | 4/2001 | Steiner |
| 6,217,294 | B1 |   | 4/2001 | Arnieri et al. |
| D451,186 | S |   | 11/2001 | Steiner |
| D451,588 | S |   | 12/2001 | Steiner |
| D452,303 | S |   | 12/2001 | Steiner |
| D454,390 | S |   | 3/2002 | Steiner |
| D454,631 | S |   | 3/2002 | Steiner |
| 6,378,845 | B1 | * | 4/2002 | Hsu ............................ 261/28 |
| 6,398,132 | B1 |   | 6/2002 | Junkel et al. |
| D482,064 | S |   | 11/2003 | Steiner et al. |
| 6,827,290 | B2 |   | 12/2004 | Zimmerman |
| D507,047 | S |   | 7/2005 | Radtke, Jr. et al. |
| D507,642 | S |   | 7/2005 | Radtke et al. |
| D548,454 | S |   | 8/2007 | Radtke et al. |
| 2002/0148909 | A1 |   | 10/2002 | Junkel et al. |
| 2006/0086821 | A1 | * | 4/2006 | Junkel et al. ................. 239/302 |
| 2006/0273195 | A1 |   | 12/2006 | Junkel |

\* cited by examiner

*Primary Examiner*—Scott Bushey
(74) *Attorney, Agent, or Firm*—Brooks Kushman P.C.

(57) ABSTRACT

A fan spray device is provided with a housing having a shape of a character head. A fan assembly is provided on the character head housing with a propeller for generating a stream of forced air away from the housing. A spray assembly is provided on the housing proximate to the propeller to dispense liquid into the stream of forced air. A handle is operably connected to the housing for movement between a retracted position and an extended position.

20 Claims, 4 Drawing Sheets

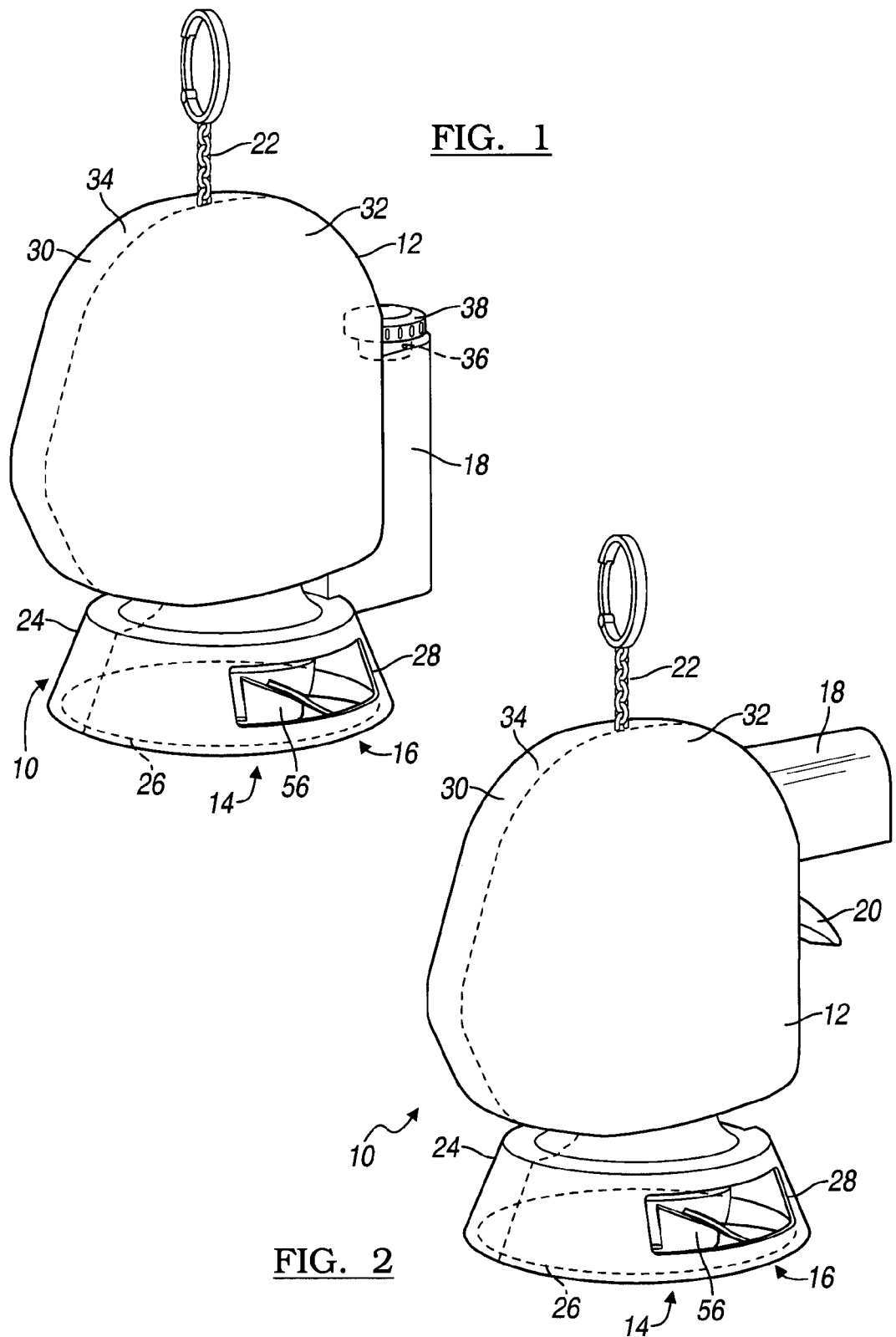

FAN SPRAY DEVICE

BACKGROUND

1. Technical Field

Multiple embodiments relate to hand held fan spray devices for use in cooling individual users.

2. Background Art

A hand held spray device typically stores liquid to dispense the liquid upon actuation of a trigger. Actuation of the trigger of the spray device produces a liquid stream and/or a liquid mist from a nozzle of the spray device. Liquid streams and/or mists are often used when dispensing liquid in order to cool a user when sprayed upon a face or body of the user and as the liquid evaporates to further cool the user.

A hand held fan device generally utilizes battery power to provide air movement and cool a user through convection. The fan device is typically mounted on the spray device to produce a fan spray device. The fan of the fan spray device facilitates additional cooling of the user through convection from the air movement and further misting of the liquid dispensed upon actuation of the trigger to cool the user upon contact of the liquid and additionally as the liquid evaporates off of the user. The fan can be actuated by the trigger or can have actuation separate from the trigger.

The spray device, the fan device and the fan spray device are generally employed in order to cool users when the users are spending a large amount of time outdoors in a hot summer climate strolling, socializing and/or waiting in an outdoor thoroughfare.

SUMMARY

In one embodiment, a fan spray device is provided with a housing having a shape of a character head. A fan assembly is provided on the character head housing with a propeller for generating a stream of forced air away from the housing. A spray assembly is provided on the housing proximate to the propeller to dispense liquid into the stream of forced air. A handle is operably connected to the housing for movement between a retracted position and an extended position.

In another embodiment, a fan spray device is disclosed and has a housing. A fan assembly provided at a first end of the housing. A spray assembly is provided proximate the fan assembly to dispense liquid. A handle is pivotally mounted on the housing having an actuation member provided thereon. The handle has a liquid reservoir provided therein. A port provides access to the liquid reservoir. The handle pivots between a retracted position and an extended position such that the actuation member and the port are only accessible in one of the retracted position and the extended position.

In yet another embodiment, a fan spray device is disclosed. A housing has a shape of a character head. A fan assembly is provided on the character head housing for generating a stream of forced air away from the housing. A spray assembly has an outlet proximate the fan assembly to dispense liquid into the stream of forced air. A handle is pivotally mounted on the character head housing such that the handle pivots between a retracted position and an extended position generally perpendicular to the retracted position. A connector is mounted to the character head housing at a second end of the character housing that is opposite the first end.

BRIEF DESCRIPTION OF THE DRAWINGS

FIG. 1 is a perspective view of an embodiment of a fan spray device in a retracted position;

FIG. 2 is a perspective view of the fan spray device of FIG. 1 in an extended position;

DETAILED DESCRIPTION OF EMBODIMENTS

Figure 3:
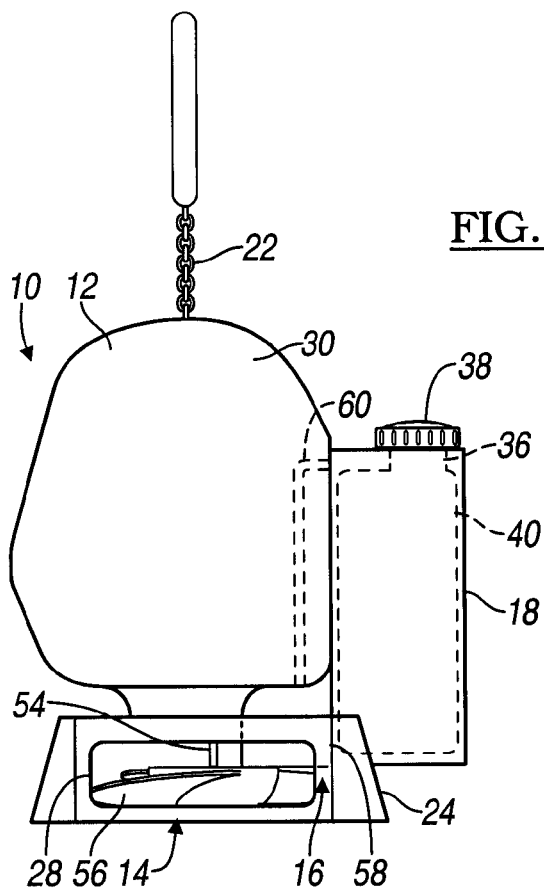
FIG. 3 is a side perspective view of the fan spray device of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

In prior art spray devices having a novelty character head mounted thereon, the character head is mounted directly on a liquid intake port. Placement of the character head on the liquid intake port of the spray device requires a user to dismount the character head to access the liquid intake port and fill the spray device. The required detaching of the character head increases complexity of filling and refilling of the fan spray device. The spray device typically has a nozzle that aligns with a mouth area of the character head, which may create difficulty for the user to attach and detach the character head.

For many typical fan spray devices, access to a power source, such as the batteries, is restricted because a fan is added to a spray device as an accessory. Additionally, the height of the fan spray device is typically large because of the axial alignment of the fan, the spray nozzle, and a handle of the fan spray device. The height is also generally large because a fan assembly is merely added to a prefabricated spray device.

With reference to FIGS. 1-6, a fan spray device is illustrated and generally referenced by numeral 10. The fan spray device 10 has a housing 12. The housing 12 is provided to support a fan assembly 14 and a spray assembly 16. The fan assembly 14 is provided to force air movement and the spray assembly 16 dispenses liquid. The fan assembly 14 rotates, which forces air movement so that the a stream of liquid and/or a mist of liquid are entrained in the forced air movement to cool the user with both the forced air and entrained stream and mist.

In the illustrated embodiment, the housing 12 is formed in the shape of a novelty character head 18. The character head housing 12 may have a variety of shapes. For example, the character head 18 may have a shape of an animal character, a cartoon character or any other novelty shape. Of course, any suitable shape for a character head 18, which may be attractive to potential users such as children, is contemplated within the scope of the present invention.

In one embodiment, the character head housing 12 is integrally formed. Integral formation of the character head housing 12 reduces complexity of the fan spray devices 10 may reduce the size of the fan spray device 10. In another embodiment, a character head is mounted on the housing 12 after the housing 12 is formed. The character head may be removably mounted on the housing 12 so that the user can remove and attach the character head. Alternatively, the character head may be permanently mounted on the housing 12. The character head may be mounted to the housing 12 through the use of fasteners or adhesive. Of course, the character head may be removably or permanently mounted to the housing 12 in any suitable manner.

A handle 18 is pivotally attached to the housing 12 in any suitable manner. In one embodiment, the handle 18 is attached to the housing 12 with fasteners that allow a limited range of movement. In another embodiment, the handle 18 is integrally formed with the housing 12 and has a pivotal joint to allow the handle 18 to pivot relative to the housing 12. In at least one embodiment, a release button is pressed to allow the handle 18 to pivot and lock. Any suitable pivotal motion and/or locking between the housing 18 and the handle 18 is contemplated within the scope of the present invention. In at least one embodiment, the handle 18 is ergonomically designed to be sized for a user to grasp.

Figure 4:
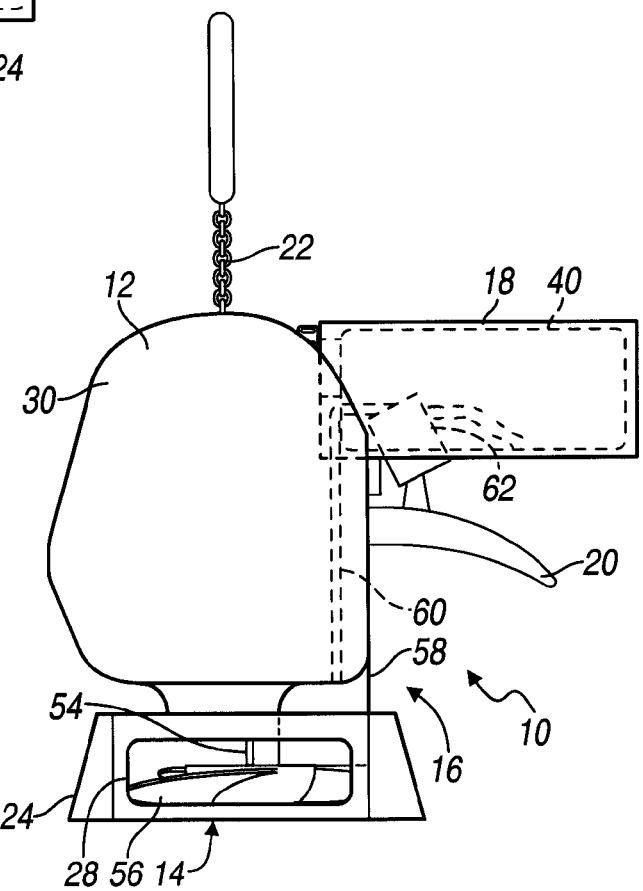
FIG. 4 is a side perspective view of the fan spray device of FIG. 3.
Figure 5:
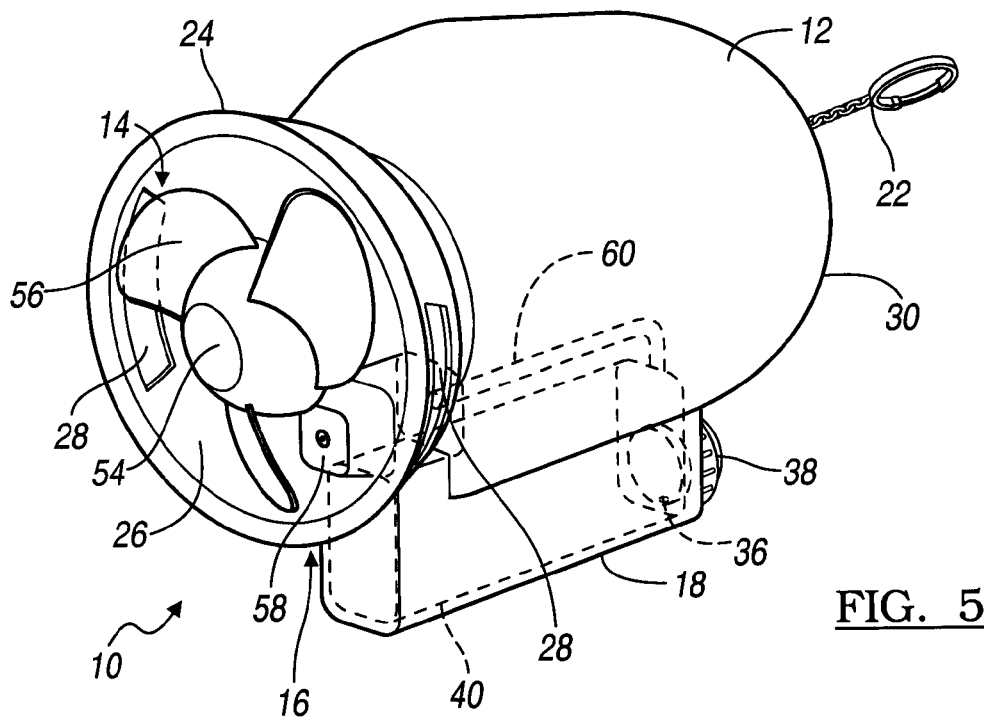
FIG. 5 is a perspective view of the fan spray device of FIG. 1.
Figure 6:
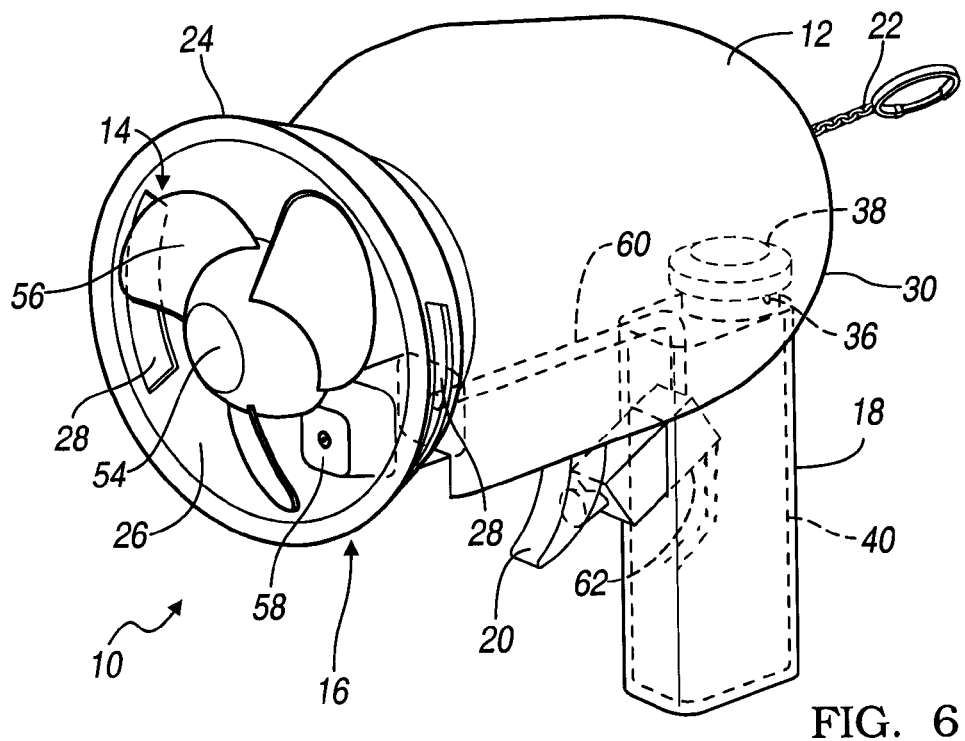
FIG. 6 is a perspective view of the fan spray device of FIG. 3.

In FIGS. 1, 3 and 5, the handle 18 is depicted in a retracted position so that the fan spray device 10 is compact. In FIGS. 2, 4 and 6, the handle 18 is depicted in an extended position. In at least one embodiment, the user releases the handle 18 from the retracted position with a release mechanism and the handle 18 is biased towards the extended position. The user may disengage the release mechanism and push the handle 18 to pivot the handle 18 from the extended position to the retracted position. With the handle 18 in the extended position, the fan assembly 14 is operable to provide an air stream and the spray assembly 16 is operable to provide liquid upon actuation of the trigger 20 by the user. In at least one embodiment, the trigger 20 collectively actuates the fan assembly 14 and the spray assembly 16.

As illustrated in FIGS. 2, 4 and 6, the trigger 20 is accessible only when the handle 18 is in the extended position. Concealing the trigger 20 in the retracted position allows the fan spray device 10 to be portable since neither the fan assembly 14 nor the spray assembly 16 can be actuated.

Since the fan spray device 10 is portable with the handle 18 in the retracted position, a connector 22 may be mounted to the housing 12, as illustrated in FIGS. 1-6. In the illustrated embodiment, the connector 22 is a key chain. In another embodiment, the connector 22 is a clip. The connector 22 may be any suitable size and shape. Additionally, the connector 22 may be mounted to the housing 12 at any suitable location.

In the illustrated embodiment, the housing 12 has a base portion 24, which has a flat edge to rest upon an underlying support surface. Of course, the base portion 24 may be adapted to rest upon an underlying support surface in any suitable manner. The base portion 24 may have a first aperture 26 to expose portions of the fan assembly 14 and the spray assembly 16. The bottom aperture 26 may be provided along a bottom surface of the base portion 24. The base portion 24 may have a side aperture 28 provided along a side of the base portion 24 to facilitate air movement by the fan assembly 14 so air can flow in through the side aperture 28 and out towards the user through the bottom aperture 26. As illustrated in FIGS. 5-6, a pair of side apertures 28 may be formed in the base portion 24 of the housing 12. Of course, any suitable size and amount of bottom apertures 26 and side apertures 28 are contemplated within the scope of the present invention.

An upper portion 30 may be connected to the base portion 24 of the housing 12. In at least one embodiment, the upper portion 30 is integrally formed with the base portion 24. In another embodiment, the upper portion 30 is separately formed and joined to the base portion 24 in a suitable manner, such as utilizing fasteners or adhesive. In at least one embodiment, the upper portion 30 is formed in a character head shape. In at least another embodiment, both the base portion 24 and the upper portion 30 are formed in a character head shape.

The housing 12 may have a first outer housing portion 32 attached to a second housing portion 34, which can be referred to as a clamshell housing 12. The first housing portion 32 and the second housing portion 34 collectively form the housing 12. In another embodiment, the housing 12 has three or more members 32, 34, which collectively form the housing 12. Of course, any suitable amount of members 32, 34 is contemplated within the scope of the present invention.

With the handle 18 in the retracted position, as illustrated in FIGS. 1, 3 and 5, a port 36 is exposed on the handle 18 and covered with a port cap 38. The port 36 is connected to a liquid reservoir 40 to receive liquid. The liquid reservoir 40 is provided within the handle 18 to store liquid and is connected to the spray assembly 16 to provide liquid to the spray assembly 16 upon actuation of the trigger 20 when the handle 18 is in the extended position. The liquid reservoir 40 may be provided within the handle 18 so that the fan spray assembly 10 can be compact and have a reduced height compared to known fan spray devices. In another embodiment, the liquid reservoir 40 is provided within a portion of the housing 12. The liquid reservoir 40 may be located in two or more portions of the housing 12. Of course, any suitable location within the body 12 for the liquid reservoir 30 is contemplated within the scope of the present invention. In one embodiment, the liquid reservoir 40 is separately formed within the handle 18. In another embodiment, the liquid reservoir 40 is integrally formed within the handle 18. In another embodiment, the liquid reservoir 40 is separately formed and is mounted within the handle 18.

The port 36 is spaced apart from the upper portion 30 of the housing 12 so that the user can fill the liquid reservoir 40 of the fan spray device 10 without interfering with the upper portion 30 and/or having to remove the upper portion 30, which may be shaped as a character head. Since the user does not interfere with the upper portion 30 of the housing or have to remove the character head upper portion 30, filling and refilling of the fan spray device 10 is easier and more convenient than in prior art fan spray devices having character heads.

The port cap 38 is mountable on the port 36 so that liquid is sealed within the liquid reservoir 30. In one embodiment, the port cap 38 is secured upon the port 36 by a threaded engagement. In another embodiment, the port cap 38 is secured upon the port 36 by applying pressure upon the port cap 38 to snap on the port 36. Of course, the port cap 38 may be secured upon the port 36 in any suitable manner and may be connected to the housing 12 by a tether so that the port cap 38 is not easily lost.

The liquid reservoir 30 is connected to the spray assembly 16 so that when the trigger 20 is actuated when the handle 28 is in the extended position, liquid is dispensed from the spray assembly 16. Liquid can be dispensed from the spray assembly 16 as a stream and/or as a mist. While the liquid is dispensed from the spray assembly 16, the fan assembly 14 rotates, which forces air movement so that the stream and the mist are entrained in the forced air movement to further cool the user with both the forced air and entrained stream and mist.

Figure 7:
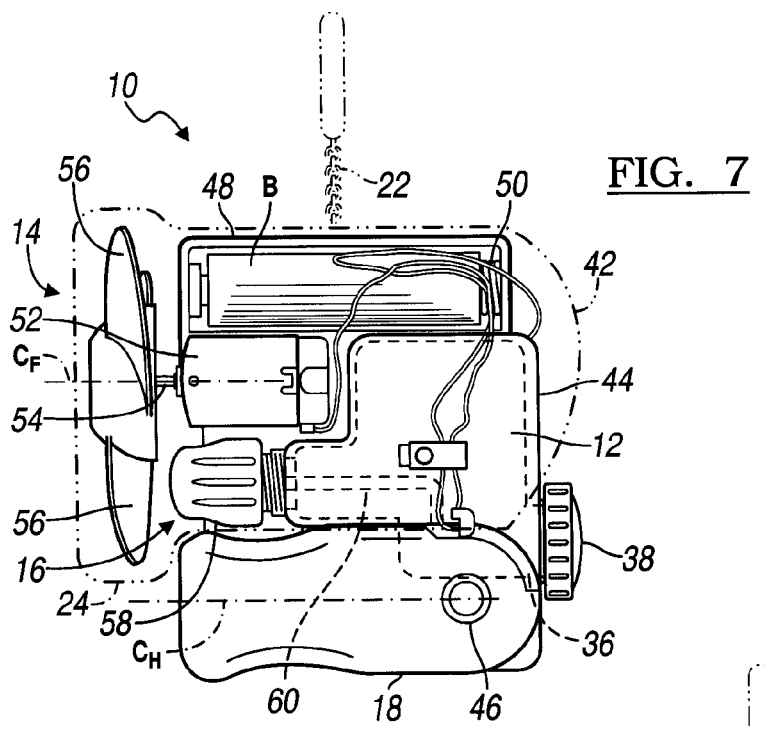
FIG. 7 is a side perspective view of an embodiment of the fan spray device of FIG. 1 partially assembled.
Figure 8:
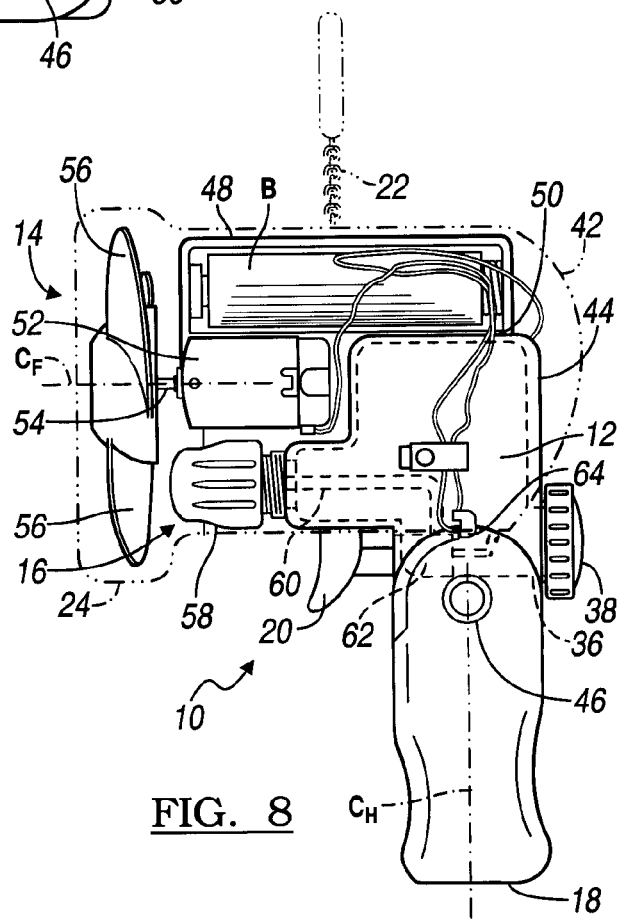
FIG. 8 is a side perspective view of an embodiment of the fan spray device of FIG. 2 partially assembled.

With reference now to FIGS. 7-8, an embodiment of the fan spray assembly 10 is illustrated with an outer portion 42 of the housing 12 removed for illustrative purposes. The outer portion 42 may include the base portion 24 and the upper portion 30 and can be shaped as a character head. The outer portion 42 can be mounted to an inner portion 44 of the housing 12 in any suitable manner. The inner portion 44 of the housing may be completely covered by the outer portion 42.

The handle 18 is pivotally connected to the inner portion 44 of the housing 12 with a pivotal joint 46. The pivotal joint 46 may lock the handle 18 relative to the inner housing 44 as the handle 18 moves from the retracted position, illustrated in FIG. 7 to the extended position, illustrated in FIG. 8. Any suitable pivotal joint 46 is contemplated within the scope of the present invention.

In FIG. 7, the handle 18 is in the retracted position. In the retracted position, a centerline $C_H$ of the handle 18 is generally parallel to a centerline $C_F$ of the fan assembly 14. When the centerline $C_H$ of the handle 18 is generally parallel to the centerline $C_F$ of the fan assembly 14, the fan spray device 10 is compact and can be easily transported without actuation of the fan assembly 14 or the spray assembly 16. In FIG. 8, the handle 18 is in the extended position and the centerline $C_H$ of the handle 18 is generally perpendicular to the centerline $C_F$ of the fan assembly 14 to allow the user to easily hold and control of the fan spray device 10 by the user.

As illustrated FIGS. 7-8, the inner portion 44 of the housing 12 has a battery storage compartment 48 formed therein. The battery storage compartment 48 is sized to receive one battery B and may be sized to receive any amount of batteries for driving a motor 52. The battery storage compartment 48 is in electrical connection with the fan assembly 14 via wiring 50. The battery storage compartment 48 may include a cover that can be mounted on the battery storage compartment 48 to protect batteries stored therein. The cover may be mounted on the battery storage compartment 48 in any suitable manner within the scope of the present invention.

In the illustrated embodiment, the inner portion of the housing 12 includes the liquid reservoir 40 formed therein. The liquid reservoir 40 is connected to the port 36. As depicted, the port 36 is accessible when the handle 18 is in both the retracted position, illustrated in FIG. 7 and the extended position, illustrated in FIG. 8. A port cap 38 is mounted to the port 36 to retain the liquid within the liquid reservoir 40.

The fan assembly 14 has a motor 52 that is powered by the battery B mounted in the battery storage compartment 48. The motor 52 has a rotational output that is connected to a hub 54. Blades 56 are provided on the hub 54. Actuation of the motor 52 causes the hub 54 to rotate the blades 56. The blades 56 provide a stream of air to cool the user.

As illustrated, the spray assembly 16 has a nozzle 58 provided on the housing 12. The nozzle 58 dispenses liquid from the liquid reservoir 40. The nozzle 58 is connected to the liquid reservoir 40 with a duct 60. Upon actuation of the trigger 20 when the handle 18 is in the extended position, a pump 62 displaces liquid from the liquid reservoir 20 through the duct 60 so that the liquid is dispensed out of the nozzle 58 via a stream or a mist.

The spray assembly 16, illustrated in FIG. 8, is actuated when a user pivots the trigger 20 generally toward the handle 18. In one embodiment, when the trigger 20 is pulled, the fan assembly 14 is actuated because the trigger 20 causes a switch 64 to complete an electric circuit between the battery B provided in the battery storage compartment 48 and the motor 52. The fan assembly 14 may shut off whenever the switch 64 is no longer pulled or displaced by the user. In another embodiment, the fan assembly 14 automatically shuts off after a specified amount of time.

When the fan assembly 14 is driven so that the blades 56 and hub 54 are rotating and liquid is dispensed through the nozzle 58, the user is collectively cooled by the liquid dispensed through the nozzle 58 and air displaced by the blades 56 of the fan assembly 14. In one embodiment, the nozzle 58 is provided proximate the blades 56 of the fan assembly 14 so that as the blades 56 rotate, liquid dispensed from the nozzle 58 is propelled toward the user as a mist so that the user is not directly hit by the liquid as the liquid is dispensed from the nozzle 58.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fan spray device comprising:
    a housing having a shape of a character head;
    a fan assembly provided on the character head housing with a propeller for generating a stream of forced air away from the housing;
    a spray assembly provided on the housing proximate to the propeller to dispense liquid into the stream of forced air; and
    a handle operably connected to the housing for movement between a retracted position and an extended position.

2. The fan spray device of claim 1 wherein the handle further comprises a liquid reservoir and a port providing access to the liquid reservoir.

3. The fan spray device of claim 2 wherein the handle is pivotal between the retracted position and the extended position such that the port is only accessible in one of the retracted position and the extended position.

4. The fan spray device of claim 1 wherein the spray assembly further comprises:
    a liquid reservoir provided within the handle;
    a duct in fluid communication with the liquid reservoir;
    a pump connected to the duct;
    a trigger pivotally connected to the handle to actuate the pump; and
    a nozzle in fluid communication with the duct such that when the trigger is pivoted, liquid is pumped from the liquid reservoir through the duct and sprayed out of the nozzle.

5. The fan spray device of claim 4 wherein the trigger is only actuable in one of the retracted position and the extended position.

6. The fan spray device of claim 5 wherein the trigger is concealed in the other of the retracted position and the extended position.

7. The fan spray device of claim 4 wherein the trigger actuates the fan assembly.

8. The fan spray device of claim 1 wherein the propeller of the fan assembly further comprises at least one flexible fan blade.

9. The fan spray device of claim 1 further comprising a connector mounted to the character head housing and spaced apart from the propeller.

10. The fan spray device of claim 9 wherein the connector further comprises a key chain.

11. The fan spray device of claim 1 further comprising a battery storage compartment provided within the character head housing and sized to receive at least one battery such that the battery storage compartment is in electrical communication with the fan assembly to power the fan assembly;

wherein the fan assembly further comprises:
a motor in electrical communication with the battery storage compartment and having a rotational output, and
a hub connected to the motor to receive the rotational output such that the propeller is mounted on the hub.

12. The fan spray device of claim 11 wherein the handle generally is parallel to a central axis of to the hub of the fan assembly in the retracted position.

13. The fan spray device of claim 12 wherein the handle is generally perpendicular to the central axis of the hub of the fan assembly in the extended position.

14. The fan spray device of claim 1 further comprising a base mounted on the character head housing at the first end, encircling the propeller of the fan assembly, and adapted to rest upon an underlying support surface.

15. The fan spray device of claim 14 wherein the base has at least two apertures to facilitate air movement by the fan assembly.

16. The fan spray device of claim 15 wherein the at least two apertures further comprises:
a first aperture aligned with a portion of the fan assembly and provided on a bottom portion of the base;
a second aperture provided on a side portion of the base; and
a third aperture provided on a side portion of the base in alignment with the second aperture to facilitate air movement by the fan assembly.

17. A fan spray device comprising:
a housing;
a fan assembly provided at a first end of the housing;
a spray assembly provided proximate the fan assembly to dispense liquid; and
a handle pivotally mounted on the housing having an actuation member provided thereon, the handle having a liquid reservoir provided therein and a port providing access to the liquid reservoir wherein the handle pivots between a retracted position and an extended position such that the actuation member and the port are only accessible in one of the retracted position and the extended position.

18. The fan spray device of claim 17 further comprising a key chain mounted to the housing and spaced apart from the propeller.

19. A fan spray device comprising:
a housing having a shape of a character head;
a fan assembly provided at a first end of the housing for generating a stream of forced air away from the housing;
a spray assembly having an outlet proximate the fan assembly to dispense liquid into the stream of forced air;
a handle pivotally mounted on the character head housing such that the handle pivots between a retracted position and an extended position generally perpendicular to the retracted position; and
a connector mounted to the character head housing at a second end of the character housing that is opposite the first end.

20. The fan spray device of claim 19 wherein the connector further comprises a key chain.

* * * * *